United States Patent
Caye (10) Patent No.: US 10,391,914 B2
(45) Date of Patent: Aug. 27, 2019

(54) VEHICLE SEAT LATCH

(71) Applicant: Ford Global Technologies, LLC, Dearborn, MI (US)

(72) Inventor: Mark Caye, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/830,183

(22) Filed: Dec. 4, 2017

(65) Prior Publication Data

US 2019/0168652 A1   Jun. 6, 2019

(51) Int. Cl.
*B60N 2/90* (2018.01)
*B60N 2/30* (2006.01)
*B60N 2/36* (2006.01)

(52) U.S. Cl.
CPC ............ *B60N 2/919* (2018.02); *B60N 2/305* (2013.01); *B60N 2/3011* (2013.01); *B60N 2/3013* (2013.01); *B60N 2/366* (2013.01); *B60N 2002/971* (2018.02); *B60N 2205/35* (2013.01)

(58) Field of Classification Search
CPC .... B60N 2/919; B60N 2/3011; B60N 2/3013; B60N 2/305; B60N 2/366; B60N 2002/971; B60N 2205/35
See application file for complete search history.

(56) References Cited

U.S. PATENT DOCUMENTS

| | | | |
|---|---|---|---|
| 3,712,653 A | 1/1973 | Lehmann | |
| 4,475,763 A | 10/1984 | Hamatani et al. | |
| 5,558,386 A | 9/1996 | Tilly et al. | |
| 6,736,438 B1 | 5/2004 | Wieclawski | |
| 6,907,645 B2 | 6/2005 | Jenson et al. | |
| 7,568,764 B2* | 8/2009 | Harper | B60N 2/045 297/14 |
| 7,611,200 B2 | 11/2009 | Jovicevic et al. | |
| 8,562,060 B2* | 10/2013 | Kato | B60N 2/01583 296/65.12 |
| 8,662,561 B2* | 3/2014 | Runde | B60N 2/206 296/65.03 |
| 9,308,836 B2 | 4/2016 | Hausler et al. | |
| 9,333,879 B2* | 5/2016 | Wroblewski | B60N 2/0155 |
| 9,446,687 B2 | 9/2016 | Kamara et al. | |
| 9,573,490 B1* | 2/2017 | Poniatowski | B60N 2/2245 |
| 9,616,778 B1* | 4/2017 | Bates | B60N 2/146 |
| 9,677,306 B2 | 6/2017 | DeFrance | |
| 2014/0265499 A1* | 9/2014 | Pacolt | B60N 2/20 297/337 |
| 2017/0297459 A1 | 10/2017 | Simonin et al. | |

FOREIGN PATENT DOCUMENTS

CN   201089400 Y   7/2008

* cited by examiner

*Primary Examiner* — Philip F Gabler
(74) *Attorney, Agent, or Firm* — Vichit Chea; Price Heneveld LLP (57) ABSTRACT

A vehicle seating assembly latch is provided herein. The vehicle seating assembly latch includes an elongated member fixedly attached to a rear portion of a vehicle seatback. A bracket is disposed on a rear wall of a passenger compartment and includes a striker. The elongated member includes an integrally defined hook portion that retains the elongated member on the striker in an engaged condition.

14 Claims, 10 Drawing Sheets

VEHICLE SEAT LATCH

FIELD OF THE INVENTION

The present disclosure generally relates to a vehicle latch, and more particularly, to vehicle latches for a seating assembly.

BACKGROUND OF THE INVENTION

Vehicle seating assemblies may be anchored in a variety of locations within a vehicle. In some vehicles, the seating assembly may be operably coupled with a wall of a passenger compartment.

SUMMARY OF THE INVENTION

According to one aspect of the present disclosure, a vehicle seating assembly latch is provided herein. The vehicle seating assembly latch includes an elongated member fixedly attached to a rear portion of a seatback. A bracket disposed on a rear wall of a passenger compartment and including a striker therein. The elongated member includes an integrally defined hook portion that retains the elongated member on the striker in an engaged condition.

According to another aspect of the present disclosure, a latch for a vehicle seating assembly is provided herein. The latch for a vehicle seating assembly includes an elongated member fixedly attached to a rear portion of a seatback. A bracket disposed on a rear wall of a passenger compartment and including a striker therein. The elongated member includes an integrally defined hook portion that is disposed at least partially vehicle forward, vehicle rearward, above and below the striker in an engaged condition.

According to yet another aspect of the present disclosure, a vehicle seating assembly is provided herein. The vehicle seating assembly includes a plate operably coupled with a seatback. An elastically deformable elongated member extends transversely from the plate and is coupled to the plate at two end portions of the elongated member. A bracket is disposed on a wall of a passenger compartment and includes a striker. The elongated member engages the striker as the seatback is rotated to an upward position.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
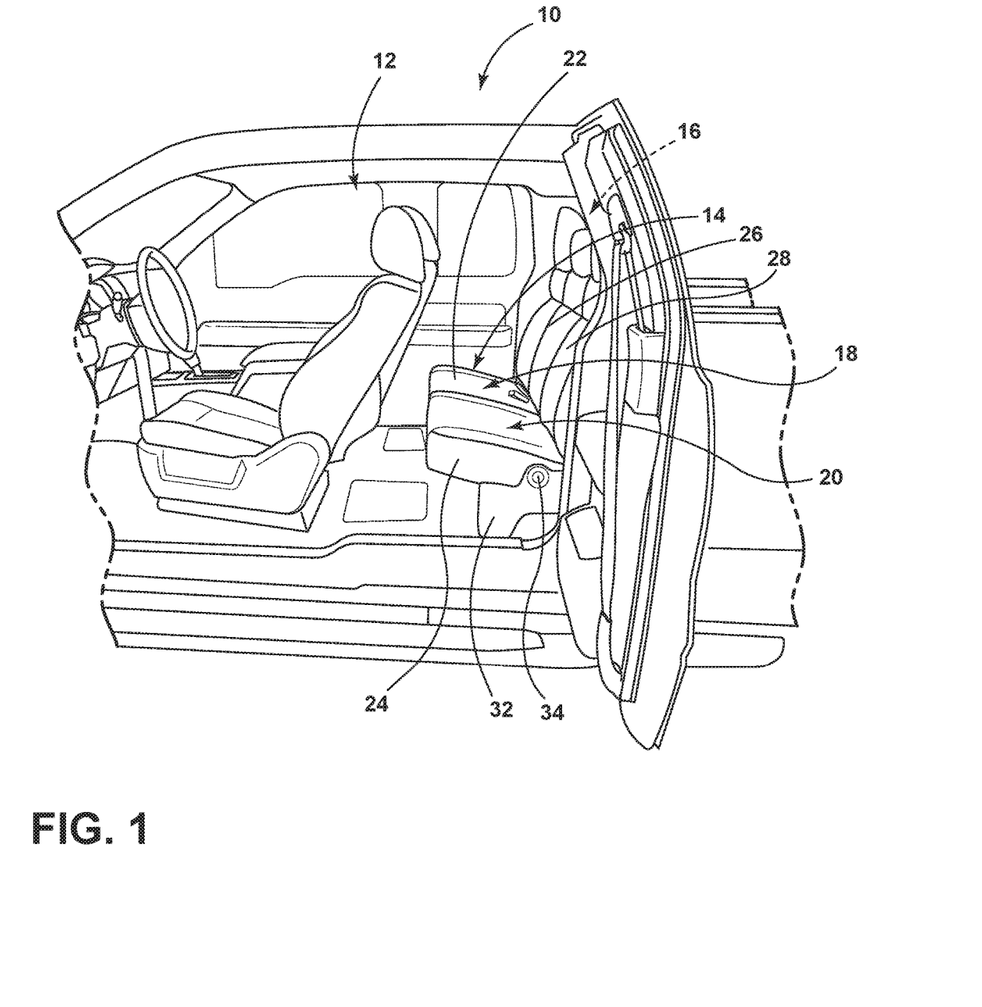
FIG. 1 is a side perspective view of a seating assembly for a vehicle incorporating a latch on a rear side, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle seating assembly latch. The vehicle seating assembly latch includes an elongated member fixedly attached to a rear portion of a vehicle seat. The elongated member may be an integrally formed component. A bracket is disposed on a wall of a passenger compartment and includes a striker. The elongated member includes an integrally defined hook portion that retains the elongated member on the striker in an engaged condition. The vehicle seating assembly latch provided herein may be manufactured at reduced costs when compared to latches currently utilized in the market. The latch provided herein may also reduce manufacturing time when assembling a vehicle.

Figure 2:
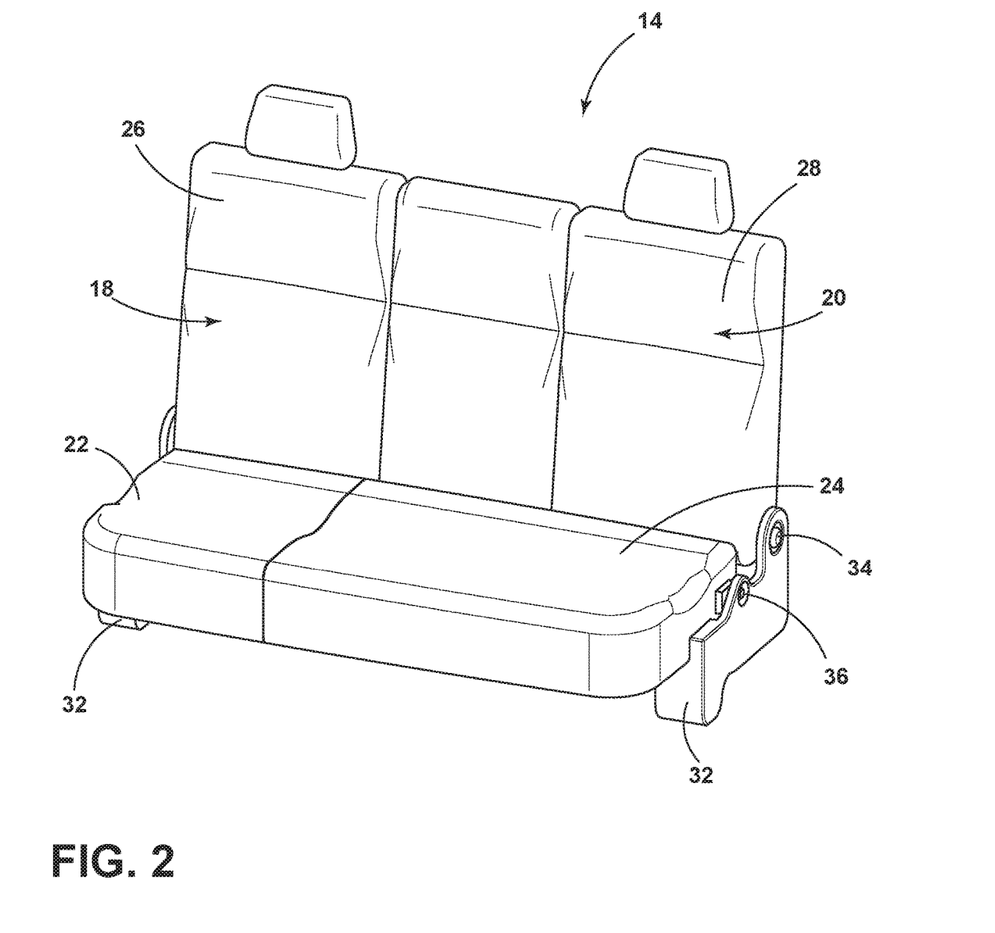
FIG. 2 is a top perspective view of the seating assembly of FIG. 1.

Referring now to FIGS. 1 and 2, a vehicle 10, such as a pickup truck, defines a passenger compartment 12. A seating assembly 14 is generally designed for use within the passenger compartment 12 and may be disposed vehicle forwardly of a rear wall 16 of the passenger compartment 12. It will be appreciated, however, that the seating assembly 14 may be used in any of a variety of vehicles. It will also be appreciated that the seating assembly 14 may be anchored to any structure within the vehicle 10 without departing from the scope of the present disclosure.

Figure 5:
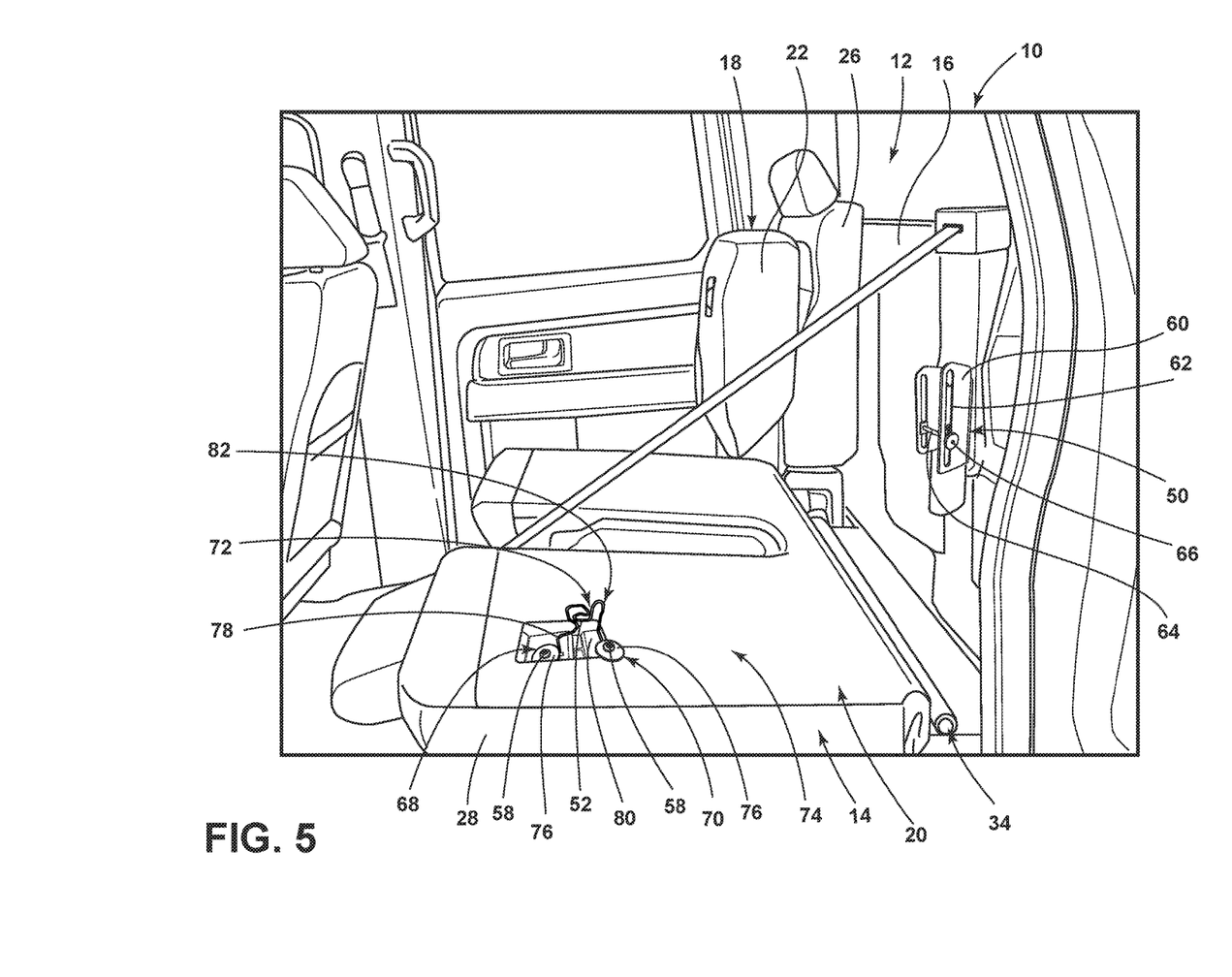
FIG. 5 is a side perspective view of the vehicle having the seating assembly in a folded position, according to some examples.

The seating assembly 14 may include first and second seats 18, 20 that are each movable between a raised vertical position, as exemplarily illustrated in FIG. 1, and a lowered horizontal position, as exemplarily illustrated in FIG. 5. Each seat 18, 20 includes a seat bottom 22, 24 coupled with a seatback 26, 28. The seating assembly 14 is hingedly connected to and supported on first and second side supports 30, 32 at a first pivot connection 34 and possibly at a second pivot connection 36. The first and second side supports 30, 32 are fixedly attached to the vehicle 10 and support the seating assembly 14 in a position above a floor of the vehicle 10. The incline of the seats 18, 20 and the seatbacks 26, 28 may be adjusted manually or may be an automated recliner system, as known in the art.

The seat bottoms 22, 24 and the seatbacks 26, 28 include a cushion and an upholstery material disposed over the cushion. A headrest may be removably and adjustably coupled with the upper portion of the seatbacks 26, 28 and may be substantially centered thereon. Moreover, the seating assembly 14 may be used with various split-seat configurations, including 50/50 seating arrangements, 40/60 seating arrangements, etc.

Figure 3:
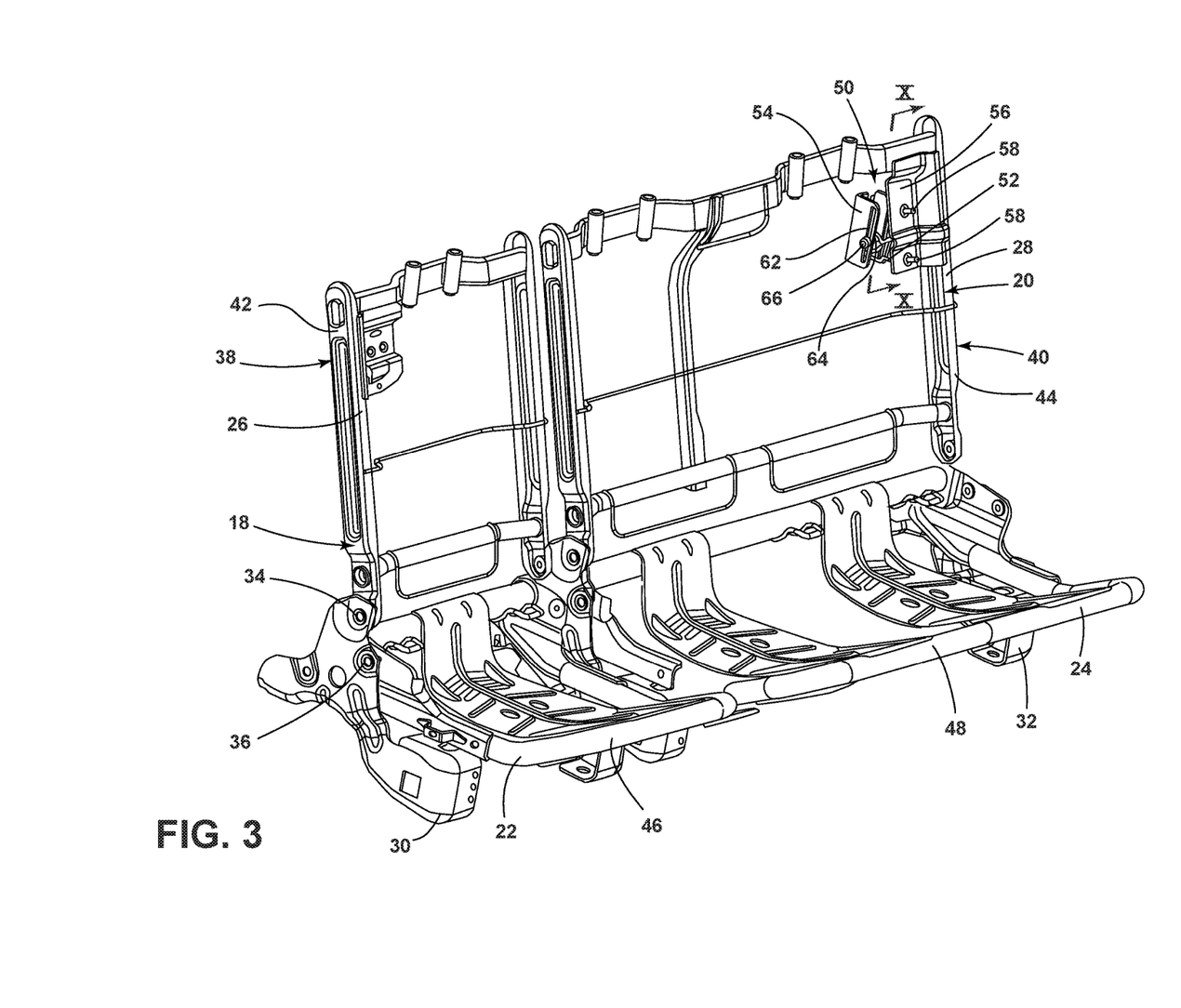
FIG. 3 is a front perspective view of a seat frame of the seating assembly, according to some examples.
Figure 4:
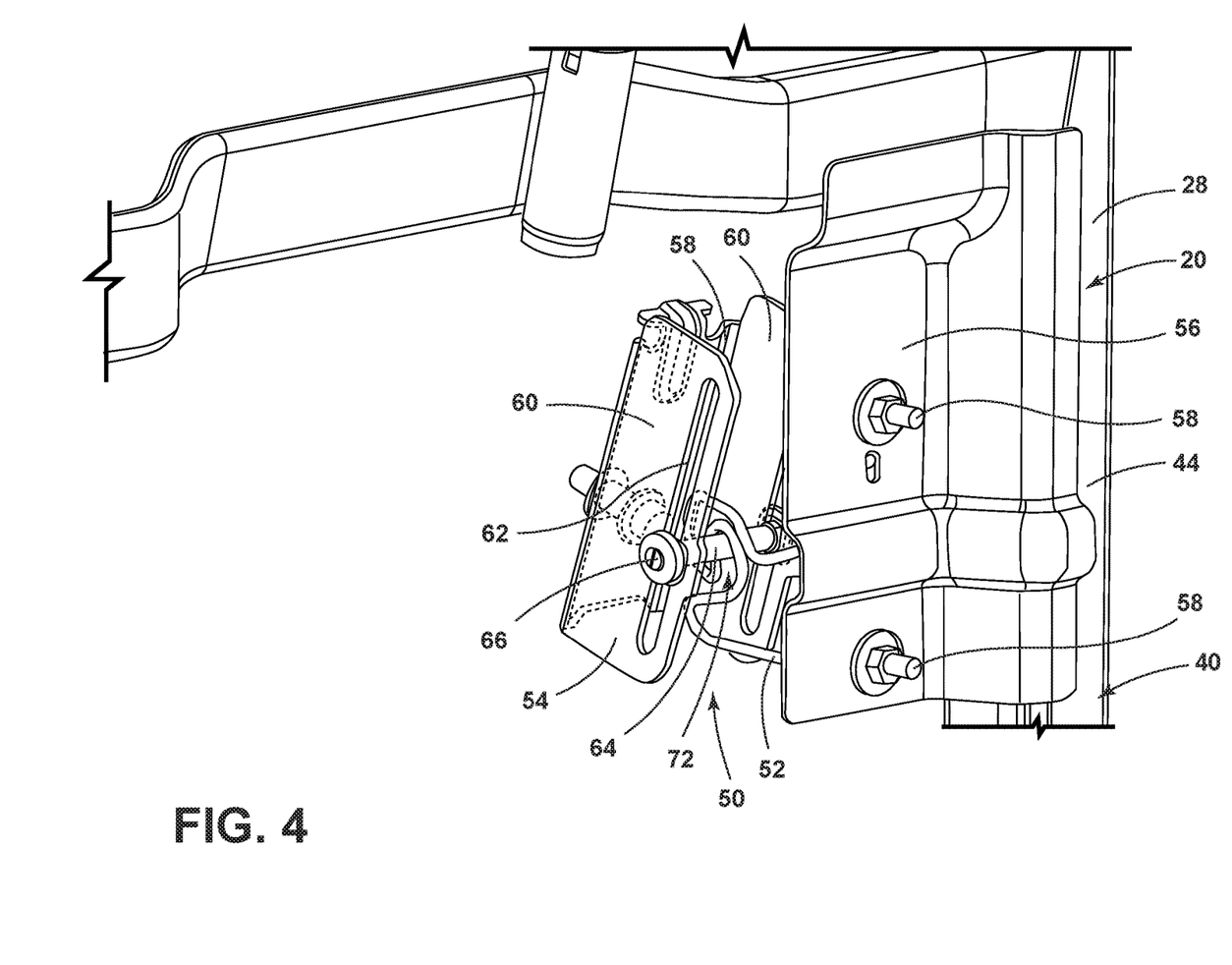
FIG. 4 is a front perspective view of the latch, according to some examples.

Referring to FIGS. 3 and 4, each seat 18, 20 includes a frame 38, 40 having an upper frame portion 42, 44 that is pivotably coupled a lower frame portion 46, 48. A latch 50 is disposed between the seatback 26, 28 and the rear wall 16 (FIG. 5) and includes an elongated member 52 and a bracket 54. The latch 50 is maintained in a disengaged condition until the seatback 26, 28 is moved to the raised vertical position. The latch 50 is then disposed in an engaged condition when the seatback 26, 28 is in the raised vertical position. The seating assembly 14 is available to support a user in a seated condition when the seatbacks 26, 28 are in the vertical position. When the seatback 26, 28 of the seating assembly 14 is in the horizontal position, a space between the seatbacks 26, 28 and the rear wall 16 may define a storage cavity rearwardly of the seatback 26, 28. When the seat 18, 20 is in the raised vertical position, items can be stored in the storage cavity. It is contemplated that the user may move the seatback 26, 28 between the raised vertical position and the lowered horizontal position manually, or by an automated system, as understood by one having ordinary skill in the art. A plate 56 is operably coupled with the upper frame portion 42, 44. The elongated member 52 is operably coupled with the plate 56 through one or more fasteners.

The bracket 54 may be operably coupled to the rear wall 16 (FIG. 2) of the passenger compartment 12 (FIG. 1). The bracket 54 may include a base section 58 and two side sections 60 extending therefrom. Each side section 60 may define an elongated slot 62. A striker 64 may extend between the two side sections 60 and within each respective elongated slot 62. A retaining feature 66 may be disposed at least one end of the striker 64 to maintain the striker 64 within the elongated slots 62. The striker 64 may be capable of sliding along the elongated slots 62 to account for variances when installing the seating assembly 14 within the vehicle 10. In some examples, the striker 64 may be coupled to the bracket 54 in any other manner without departing from the scope of the present disclosure.

Referring still to FIGS. 3-5, the elongated member 52 may be formed from an elastically deformable material. In some examples, the elongated member 52 may be formed from a resilient steel wire. The elongated member 52 includes two end portions 68, 70 that are operably coupled with the fasteners for retaining the elongated member 52 to the plate 56. The elongated member 52 further defines a hook portion 72 that is disposed between the two end portions 68, 70. The hook portion 72 is configured to engage with the striker 64 in an engaged position. In some embodiments, the engagement of the hook portion 72 on the striker 64 is semipermanent in nature. In other words, the elongated member 52 may rarely, if ever, be detached from the striker 64 once engaged. It is envisioned, however, that the hook portion 72 may be disengaged from the striker 64 when service is performed on the vehicle 10. In such circumstances, an override service procedure may be utilized to disengage the hook portion 72 from the striker 64. In some cases, the override service procedure includes the use of an additional tool that pulls vertically upward on the hook portion 72 to release the elongated member 52 from the striker 64.

Figure 6:
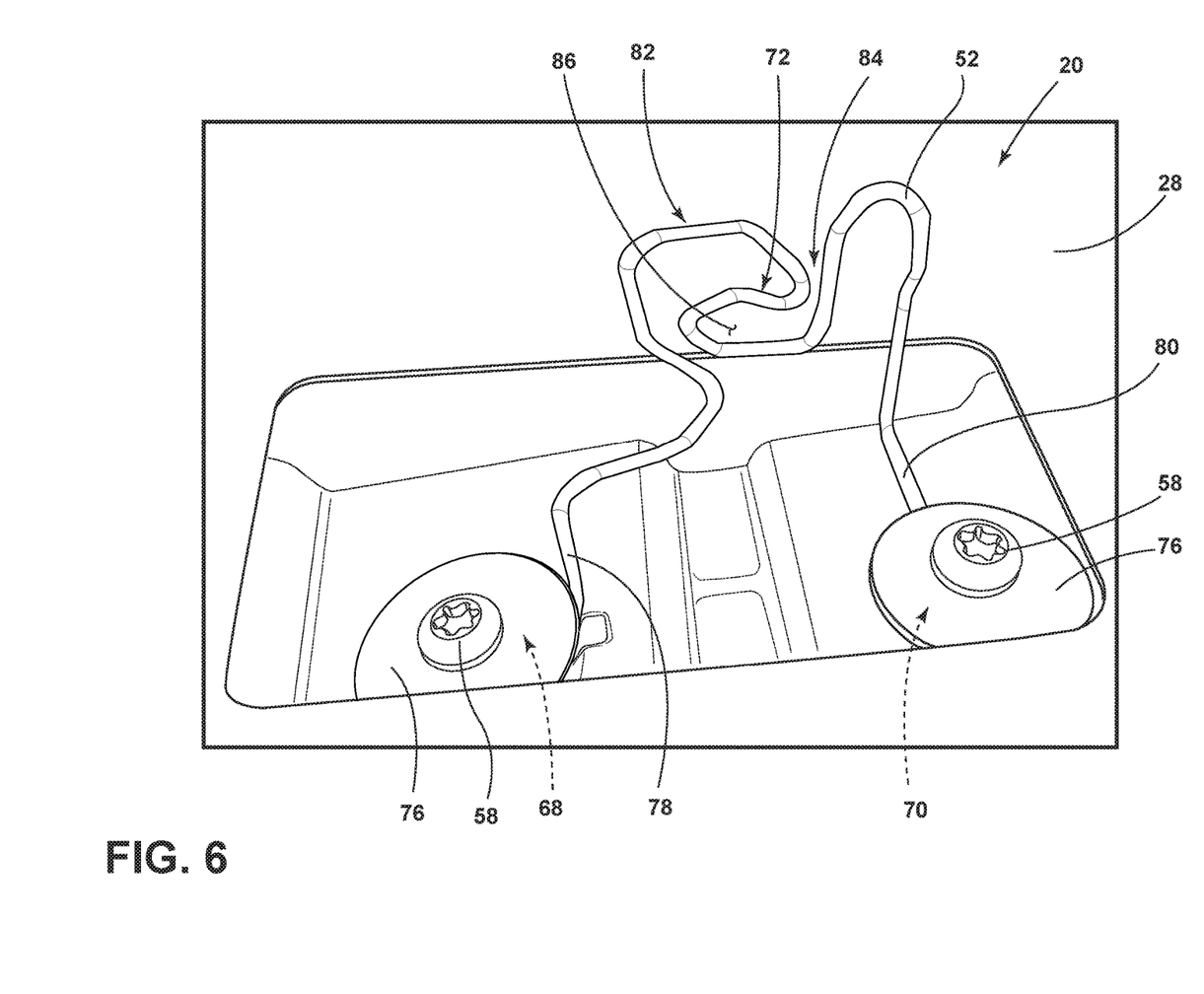
FIG. 6 is a side perspective view of an engagement member disposed on the rear side of the seating assembly, according to some examples.
Figure 7:
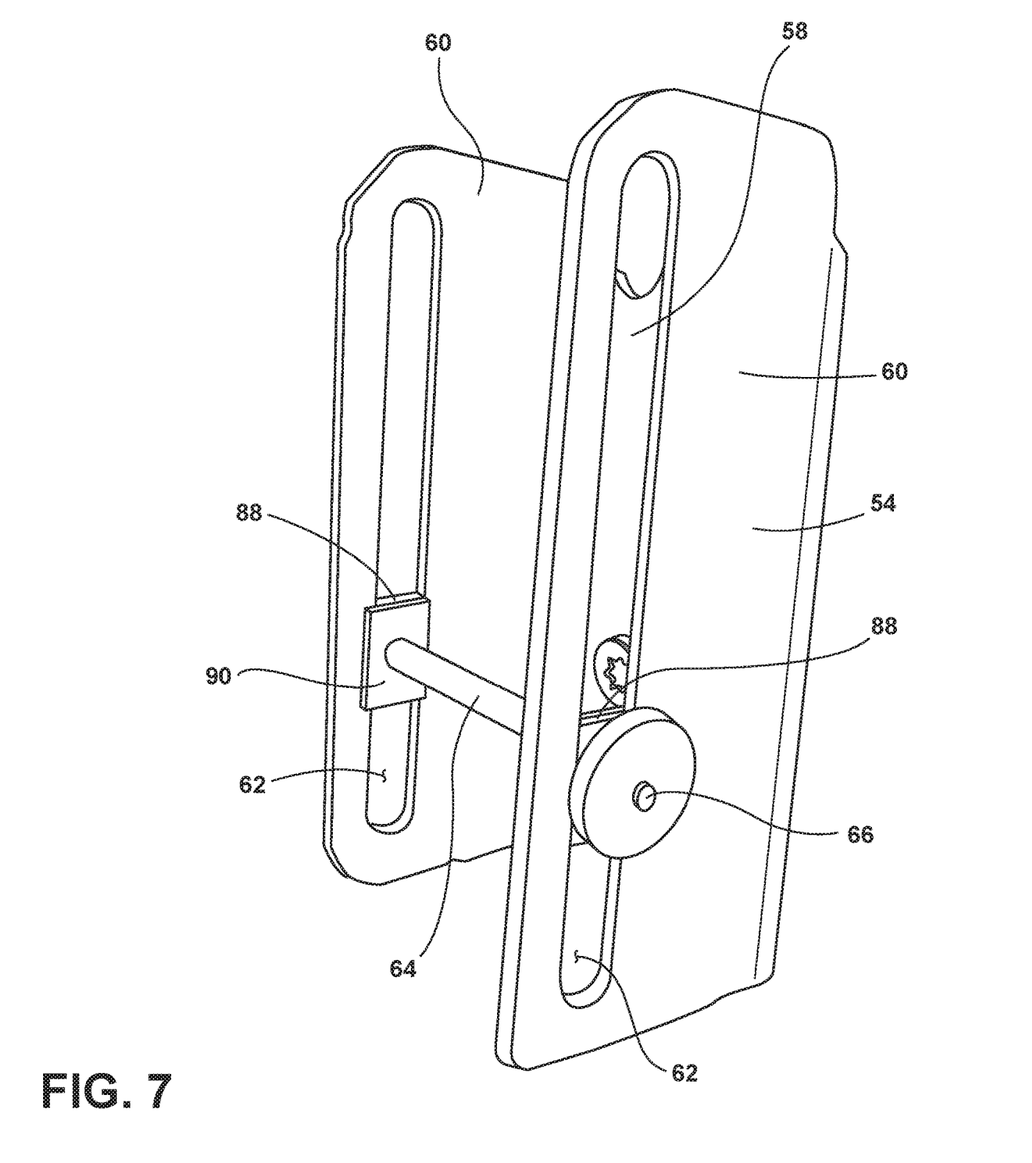
FIG. 7 is a side perspective view of an engagement bracket configured to couple with the engagement member, according to some examples.

Referring to FIGS. 5-7, a rear portion 74 of the seatback 26, 28 may have a rigid substrate and/or the plate 56 may be coupled to the rear portion 74 of the seat 18, 20. As provided herein, the elongated member 52 may be coupled to the plate 56 through one or more fasteners. A washer 76 may also be operably coupled to each fastener and/or an end portion of the elongated member 52. In some examples, the elongated member 52 may be welded or otherwise attached to the rear portion 74 of the seat 18, 20 without departing from the scope of the present disclosure. The elongated member 52 may extend between the pair of base portions 78, 80 and includes a pair of base portions 78, 80 that are respectively disposed between the hook portion 72 and the pair of end portions 68, 70. Each base portion 78, 80 may extend in a parallel orientation along the plate 56 and/or rear portion 74 of the seat 18, 20. An intermediate portion 82 may include the hook portion 72. The intermediate portion 82 may extend transversely from the base portions 78, 80. The hook portion 72 may include a channel 84 through which the striker 64 is disposed until the striker 64 is disposed within a retaining cavity 86 of the hook portion 72. As provided herein, the striker 64 may be maintained within the retaining cavity 86 in a semi-permanent condition. Moreover, when the striker 64 is engaged with the hook portion 72, the hook portion 72 may be disposed at least partially vehicle forward, vehicle rearward, above and below the striker 64.

Referring still FIGS. 5-7, the bracket 54 may be fixed to the rear wall 16 of the passenger compartment 12. As the seatback 26, 28 is rotated from a horizontal position to the vertical position, the striker 64 is disposed within the channel 84. Once the seatback 26, 28 is disposed in the vertical position, the striker 64 is disposed within the retaining cavity 86. As provided herein, the striker 64 may extend between the two side sections 60 of the bracket 54 and within a pair of elongated slots 62. The retaining feature 66 maintains the striker 64 within each of the elongated slots 62. In some examples, a washer 88 is disposed inside of the retaining feature 66. The washer 88 has an inner portion 90 that may have a width that is less than the width of the elongated slots 62 such that the inner portion 90 may be disposed in the slot 62. Moreover, the inner portion 90 may have linear sides such that the inner portion 90 is inhibited from rotation with the slots 62. The retaining feature 66 may be disposed outward of the washer 88 and can be bolted, welded, riveted or otherwise affixed to the washer 88.

Figure 8:
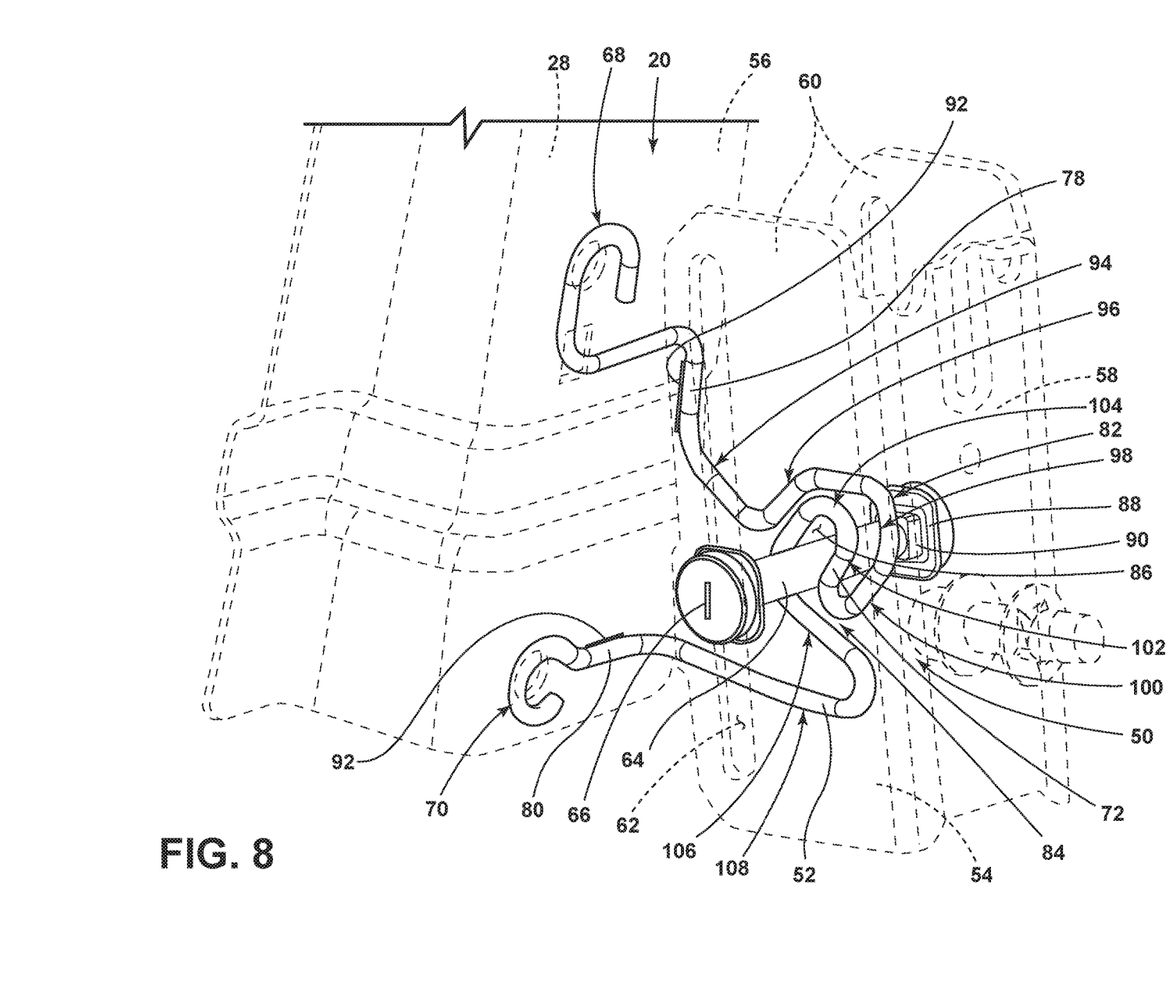
FIG. 8 is a rear perspective view of the engagement member operably coupled with the engagement bracket, according to some examples.
Figure 9:
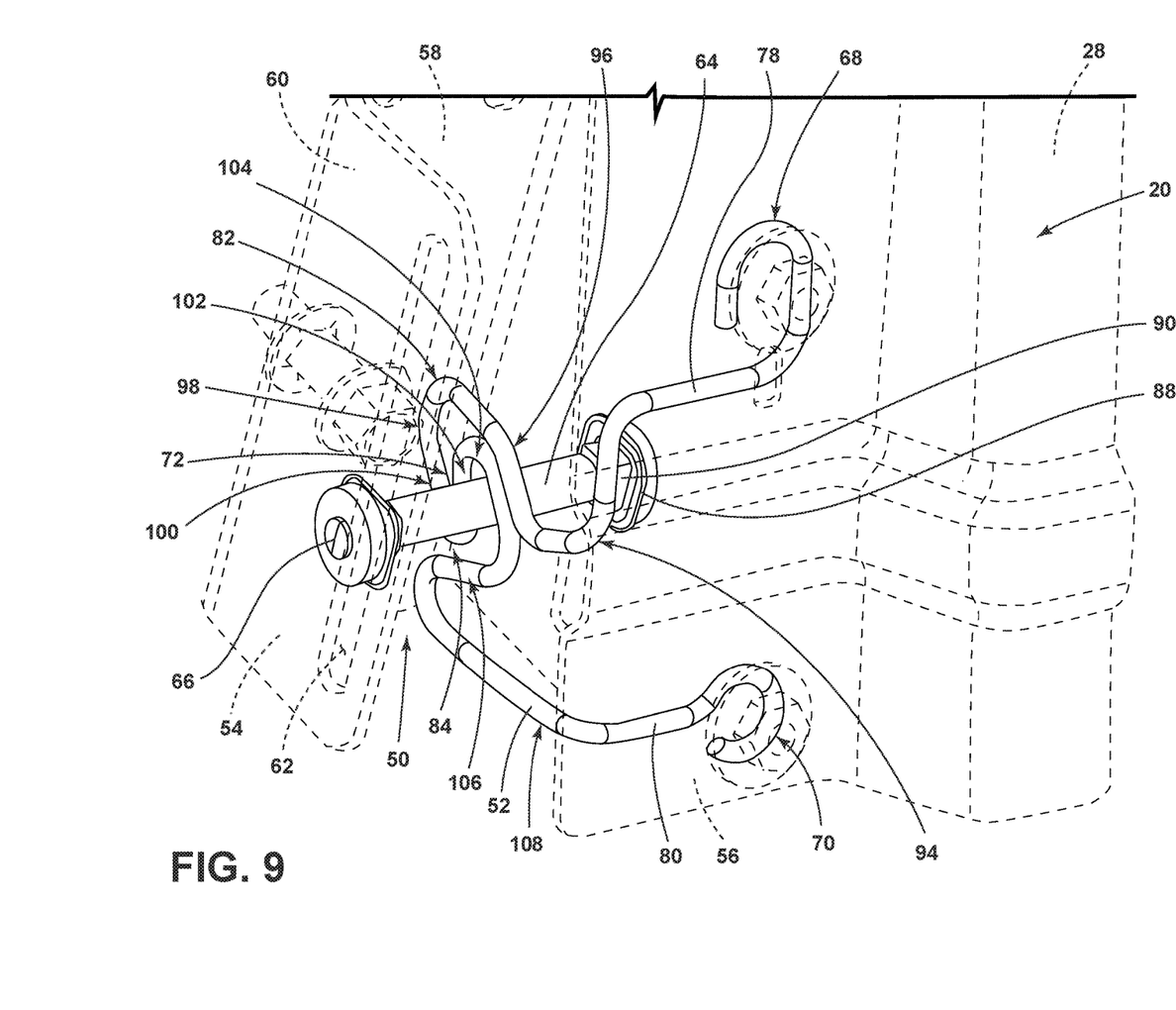
FIG. 9 is a front perspective view of the engagement member coupled with the engagement bracket, according to some examples.

Referring to FIGS. 8 and 9, the end portions 68, 70 of the elongated member 52 may partially encompass each respective fastener (FIG. 5). As provided herein, the end portions 68, 70 of the elongated member 52 may be disposed between the plate 56 and a washer 76 (FIG. 6) or another retaining device. Each base portion 78, 80 of the elongated member 52 may extend along the plate 56 and/or the rear portion 74 of the seat 18, 20. In some examples, a noise, vibration, and/or harshness (NVH) material 92 may be disposed between the base portion 78, 80 and the plate 56 to prevent additional noise during operation of the vehicle 10. The NVH material 92 may be any component known in the art, including but not limited to, a fibrous tape.

As illustrated in FIGS. 8 and 9, the intermediate portion 82 extends transversely, or vehicle rearward, from the plate 56 and includes the hook portion 72. The hook portion 72 includes the channel 84 and the retaining cavity 86. The intermediate portion 82 may include a first portion 94 therein that extends vehicle downward. A second portion 96 extends upwardly and begins to form the hook portion 72. The hook portion 72 includes a third portion 98 that extends downwardly and is continued into a fourth portion 100 that extends vehicle forward. An upwardly extending fifth portion 102 terminates at a sixth vehicle forward extending portion 104. A seventh portion 106 extends vehicle rearward and an eighth portion extends 108 vehicle rearward to couple the base portion 78, 80 to the intermediate portion 82. In some examples, the second through seventh portions 96, 98, 100, 102, 104, 106 may define the hook portion 72. Moreover, the fourth, fifth, and sixth portions 100, 102, 104 may define the retaining cavity 86. The fourth and sixth portions 100, 104 may define the channel 84. It will be appreciated, however, that the elongated member 52 may include any number of portions that are oriented in any direction to form any of the features provided herein without departing from the scope of the present disclosure. Moreover, the elongated member 52 may be formed from any number of components without departing from the scope of the present disclosure.

Figure 10:
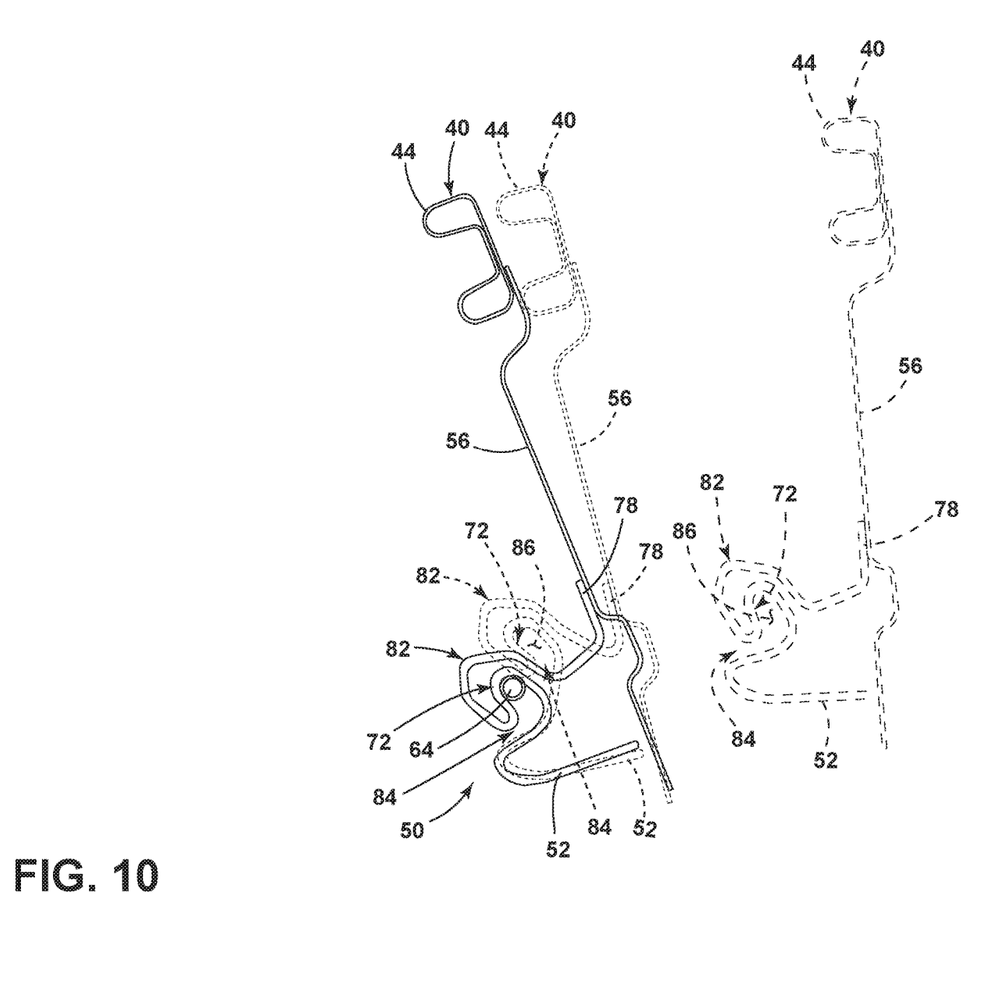
FIG. 10 is a cross-sectional view of the seating assembly taken along the line X-X of FIG. 3 showing a seatback of the seating assembly disposed in a plurality of positions, according to some examples.

Referring to FIG. 10, the elongated member 52 may be disposed in a first position, as illustrated in FIG. 5, when the vehicle seat 18, 20 is disposed in the horizontal position. As the seatback 26, 28 is rotated to a vertical position, the striker 64 is disposed within the channel 84, causing the elongated member 52 to elastically deflect in an upward direction. As the seatback 26, 28 is moved to the upright, vertical position, the striker 64 is disposed within the retaining cavity 86. As the striker 64 moves from the channel 84 to the retaining cavity 86, the hook portion 72 of the elongated member 52 moves in a downward direction. It will be appreciated, however, that the hook portion 72 of the elongated member 52, in the engaged position, may be disposed in a position that is above a disengaged, natural position of the hook portion 72. In other words, the hook portion 72 of the elongated member 52 may be disposed a first distance from each fastener in a disengaged condition. Once engaged, the hook portion 72 may be disposed a second distance from the fasteners that is varied from the first distance.

A variety of advantages may be derived from the use of the present disclosure. For example, use of the disclosed latch provides a semipermanent coupling of a seatback to a rear wall, or other anchoring location, of the passenger compartment. Moreover, the latch may still allow for movement of the seatback during servicing operations. The latch can save costs, resources, and materials and is generally more efficient than standard, conventional latches or other anchoring devices.

According to various examples, a vehicle seating assembly latch is provided herein. The vehicle seating assembly latch includes an elongated member fixedly attached to a rear portion of a seatback. A bracket disposed on a rear wall of a passenger compartment and including a striker therein. The elongated member includes an integrally defined hook portion that retains the elongated member on the striker in an engaged condition. Examples of the vehicle seating assembly latch can include any one or a combination of the following features:

- the seatback is rotatable from a horizontal position to a vertical position and the elongated member and the bracket are engaged in a vertical position;
- a plate coupled to a seat frame, wherein the elongated member includes a pair of end portions and each respective end portion partially encompasses a fastener disposed through the plate;
- the elongated member includes a pair of base portions and an intermediate portion disposed between the pair of base portions, the intermediate portion including the integrally defined hook portion;
- the hook portion of the elongated member is disposed at a first distance from a pair of fasteners operably coupled with a pair of end portions of the elongated member in a disengaged condition and a second distance from the fasteners that is varied from the first distance in an engaged condition;
- the intermediate portion includes a first portion extending vehicle downward, a second portion extending upwardly from the first portion, a third portion extending downwardly of the second portion, a fourth portion extending vehicle forward, an upwardly extending fifth portion that terminates at a sixth vehicle forward extending portion, a seventh portion extending vehicle rearward, and an eighth portion extending vehicle rearward;
- the second portion, the third portion, the fourth portion, the fifth portion, the sixth portion, and the seventh portion define the hook portion;
- the fourth portion, the fifth portion, and the sixth portion define a retaining cavity;
- the fourth and the sixth portions define a channel;
- the bracket includes a base section and a pair of side sections extending therefrom;
- the pair of side sections each define an elongated slot therein and the striker is disposed within the elongated slot; and/or
- a pair of washers respectively disposed at each end portion of the striker, each washer having an inner portion having a width that is less than the width of the pair of elongated slots and disposed in the pair of elongated slots.

Moreover, a method of manufacturing a vehicle seat assembly is provided herein. The method includes fixedly attaching an elongated member to a rear portion of a seatback. A bracket is fixedly coupled on a rear wall of a passenger compartment and including a striker therein. The elongated member includes an integrally defined hook portion that is configured to retain the elongated member on the striker in an engaged condition.

According to some examples, a latch for a vehicle seating assembly is provided herein. The latch for a vehicle seating assembly includes an elongated member fixedly attached to a rear portion of a seatback. A bracket disposed on a rear wall of a passenger compartment and including a striker therein. The elongated member includes an integrally defined hook portion that is disposed at least partially vehicle forward, vehicle rearward, above and below the striker in an engaged condition. Examples of the latch for a vehicle seating assembly can include any one or a combination of the following features:

- the seatback is rotatable from a horizontal position to a vertical position and the elongated member and the bracket are engaged in the vertical position;
- the elongated member and striker are coupled in a semi-permanent condition once engaged to one another; and/or
- the hook portion defines a channel and a retaining cavity.

According to other examples, a vehicle seating assembly is provided herein. The vehicle seating assembly includes a plate operably coupled with a seatback. An elastically deformable elongated member extends transversely from the plate and is coupled to the plate at two end portions of the elongated member. A bracket is disposed on a wall of a passenger compartment and includes a striker. The elongated member engages the striker as the seatback is rotated to an upward position. Examples of the vehicle seating assembly can include any one or a combination of the following features:

- the elongated member includes a pair of base portions and an intermediate portion disposed between the pair of base portions, the intermediate portion containing an integrally defined hook portion;
- the hook portion defines a channel and a retaining cavity; and/or
- the hook portion of the elongated member is disposed at a first distance from a pair of fasteners operably coupled with a pair of end portions of the elongated member in a disengaged condition and a second distance from the fasteners that is varied from the first distance in an engaged condition.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly latch comprising:
   an elongated member fixedly attached to a rear portion of a seatback; and
   a bracket disposed on a rear wall of a passenger compartment and including a striker therein, wherein the elongated member includes an integrally defined hook portion that retains the elongated member on the striker in an engaged condition, wherein the elongated member includes a pair of base portions and an intermediate portion disposed between the pair of base portions, the intermediate portion including the integrally defined hook portion, and wherein the intermediate portion includes a first portion extending vehicle downward, a second portion extending upwardly from the first portion, a third portion extending downwardly of the second portion, a fourth portion extending vehicle forward, an upwardly extending fifth portion that terminates at a sixth vehicle forward extending portion, a seventh portion extending vehicle rearward, and an eighth portion extending vehicle rearward.

2. The vehicle seating assembly latch of claim 1, wherein the seatback is rotatable from a horizontal position to a vertical position and the elongated member and the bracket are engaged in a vertical position.

3. The vehicle seating assembly latch of claim 2, wherein the hook portion of the elongated member is disposed at a first distance from a pair of fasteners operably coupled with a pair of end portions of the elongated member in a disengaged condition and a second distance from the fasteners that is varied from the first distance in an engaged condition.

4. The vehicle seating assembly latch of claim 1, further comprising:
a plate coupled to a seat frame, wherein the elongated member includes a pair of end portions and each respective end portion partially encompasses a fastener disposed through the plate.

5. The vehicle seating assembly latch of claim 1, wherein the second portion, the third portion, the fourth portion, the fifth portion, the sixth portion, and the seventh portion define the hook portion.

6. The vehicle seating assembly latch of claim 1, wherein the fourth portion, the fifth portion, and the sixth portion define a retaining cavity.

7. The vehicle seating assembly latch of claim 6, wherein the fourth and the sixth portions define a channel.

8. The vehicle seating assembly latch of claim 1, wherein the bracket includes a base section and a pair of side sections extending therefrom.

9. The vehicle seating assembly latch of claim 8, wherein the pair of side sections each define an elongated slot therein and the striker is disposed within the elongated slot.

10. The vehicle seating assembly latch of claim 9, further comprising:
a pair of washers respectively disposed at each end portion of the striker, each washer having an inner portion having a width that is less than the width of the pair of elongated slots and disposed in the pair of elongated slots.

11. A latch for a vehicle seating assembly comprising:
an elongated member fixedly attached to a rear portion of a seatback; and
a bracket disposed on a rear wall of a passenger compartment and including a striker therein, wherein the elongated member includes an integrally defined hook portion that is disposed at least partially vehicle forward, vehicle rearward, above and below the striker in an engaged condition, wherein the elongated member includes a pair of base portions and an intermediate portion disposed between the pair of base portions, the intermediate portion including the integrally defined hook portion, and Wherein the intermediate portion includes a first portion extending vehicle downward, a second portion extending upwardly from the first portion, a third portion extending downwardly of the second portion, a fourth portion extending vehicle forward, an upwardly extending fifth portion that terminates at a sixth vehicle forward extending portion, a seventh portion extending vehicle rearward, and an eighth portion extending vehicle rearward.

12. The latch for a vehicle seating assembly of claim 11, wherein the seatback is rotatable from a horizontal position to a vertical position and the elongated member and the bracket are engaged in the vertical position.

13. The latch for a vehicle seating assembly of claim 12, wherein the elongated member and striker are coupled in a semipermanent condition once engaged to one another.

14. The latch for a vehicle seating assembly of claim 11, wherein the hook portion defines a channel and a retaining cavity.

* * * * *